United States Patent [19]

Adams

[11] Patent Number: 5,309,492
[45] Date of Patent: May 3, 1994

[54] CONTROL FOR A CLOSED CYCLE GAS TURBINE SYSTEM

[75] Inventor: Rodney M. Adams, Annapolis, Md.

[73] Assignee: Adams Atomic Engines, Inc., Tarpon Springs, Fla.

[21] Appl. No.: 46,174

[22] Filed: Apr. 15, 1993

[51] Int. Cl.$^5$ ............................................. G21C 15/00
[52] U.S. Cl. ..................................... 376/381; 60/650; 60/652; 376/391
[58] Field of Search ............... 376/381, 391; 60/644.1, 60/39.2, 203.1, 650, 652

[56] References Cited

U.S. PATENT DOCUMENTS

| | | |
|---|---|---|
| 3,309,279 | 3/1967 | Ritz . |
| 3,503,205 | 3/1970 | Suter ..................... 60/650 |
| 3,547,379 | 12/1970 | Kappus . |
| 3,547,380 | 12/1970 | Kappus . |
| 3,583,156 | 6/1971 | Schabert ................. 60/650 |
| 3,802,992 | 4/1974 | Griffith et al. . |
| 4,000,617 | 1/1977 | Fortescue ............... 60/690 |
| 4,067,194 | 1/1978 | Fenley ................... 60/650 |
| 4,088,535 | 5/1978 | Thompson et al. . |
| 4,147,590 | 4/1979 | Szekely . |
| 4,163,365 | 8/1979 | Frutschi ................. 60/39.03 |
| 4,486,380 | 12/1984 | Schweiger et al. ..... 375/210 |
| 4,486,380 | 12/1984 | Schweiger et al. . |
| 4,756,873 | 7/1988 | Schoening . |
| 4,847,040 | 7/1989 | Becker et al. . |
| 4,850,793 | 7/1989 | Silvestri, Jr. et al. . |
| 4,863,676 | 9/1989 | Helm et al. . |
| 5,019,322 | 5/1991 | Von Charzewski et al. . |
| 5,047,204 | 9/1991 | Ales et al. . |
| 5,051,230 | 9/1991 | Teuchert et al. . |
| 5,061,435 | 10/1991 | Singh et al. . |

OTHER PUBLICATIONS

*Gas Turbine Power*, Dusinberre et al., 2d Ed. 1958, p. 219.
John F. Lee, *Theory and Design of Steam and Gas Turbine*, 1954, pp. 311–313.
Gas Turbine Construction, Including Operation and Maintenance, 1947, R. Tom Sawyer, B. of EE. M.E., pp. 102–123, Chapter VII, The Closed-Cycle Gas Turbine Unit.
Proceedings of the American Power Conference, Apr. 1992, An International Assessment of the Gas Turbine MHTGR.
IGTI-vol. 1, 1987 ASME Cogen-Turbo, International Symposium on Turbomachinery, Combined-Cycle T Echnologies and Cogeneration, Performance Potential of a Future Advanced Nuclear Gas Turbine Co. NCEPT, C. F. McDonald, pp. 247–261, The American Society of Mechanical Engineers.
Modular HTGR Gas Turbine Power Plant, Robert W. Schleicher et al., General Atomics Project 4916 Mar. 1992, General Atomics.
The Submarine Review, Jul. 1991, HTGR Gas Turbine Power Plant for Submarine Propulsion in the 21st Century, pp. 86–91.

*Primary Examiner*—Donald P. Walsh
*Assistant Examiner*—Frederick H. Voss
*Attorney, Agent, or Firm*—Oblon, Spivak, McClelland, Maier & Neustadt

[57] ABSTRACT

A throttle valve having defined characteristics controls flow of gas from a gas heater to a turbine in a closed cycle gas turbine system. The gas heater may be a nuclear reactor fueled by fission material preferably having a negative temperature coefficient of reactivity whereby the reactor automatically ceases heat production upon closing of the throttle valve.

8 Claims, 3 Drawing Sheets

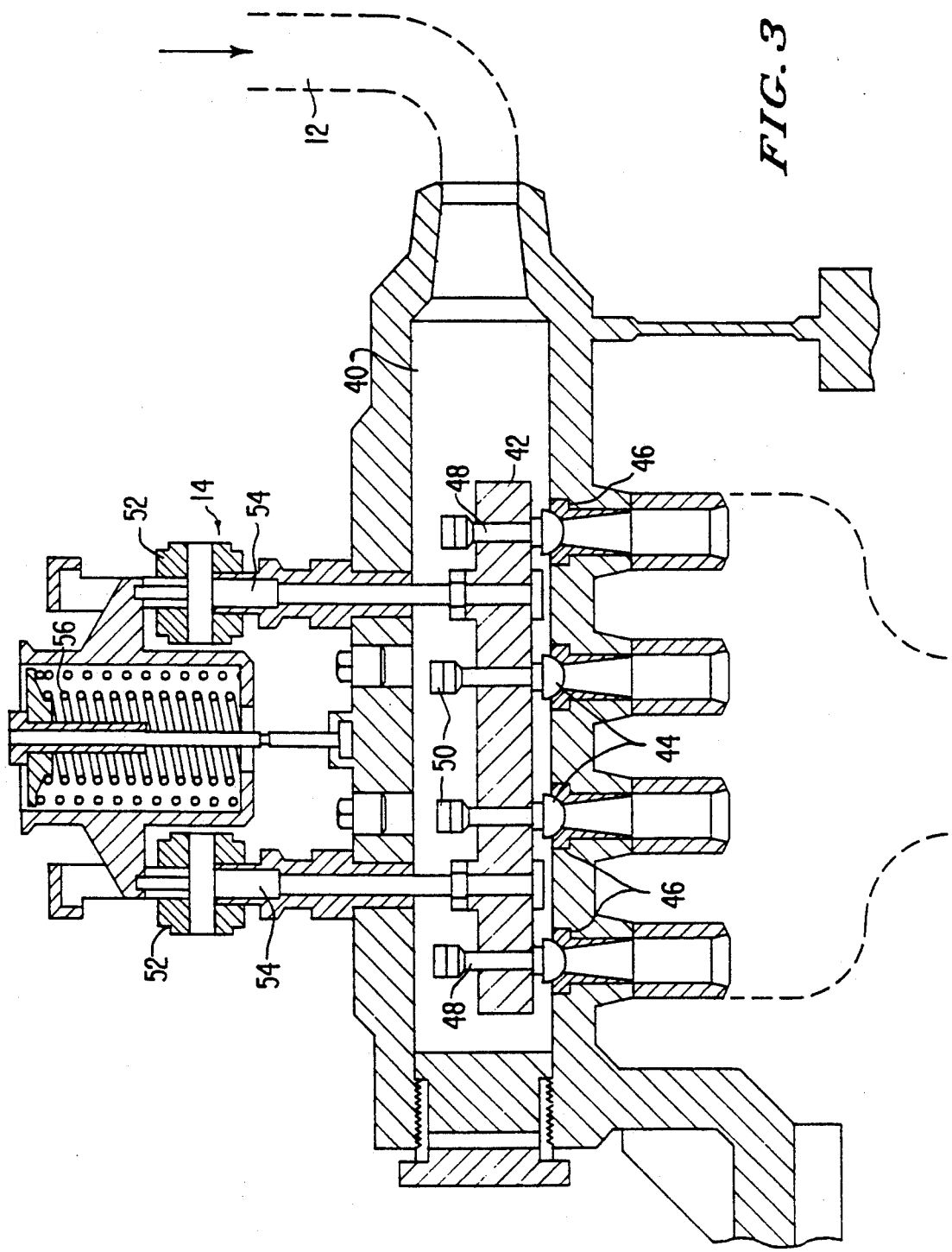

CONTROL FOR A CLOSED CYCLE GAS TURBINE SYSTEM

FIELD OF THE INVENTION

This invention relates to closed cycle gas turbine systems and more particularly to an improved means for controlling the flow of gas in such systems.

BACKGROUND OF THE INVENTION

Closed cycle gas turbine systems wherein a gas is confined in a closed circuit and heated by fossil fuel to directly drive a turbine is old. It is also old to drive a turbine by steam generated in a secondary loop which is exposed in a heat exchanger to gas heated in a gas cooled nuclear reactor. A turbine driven directly by gas in a so-called closed gas turbine Brayton cycle utilizing as the heat source system a gas cooled nuclear reactor is desirable since such a system reduces the complexities called for by a secondary loop and would reduce the overall size of the system to the point where it could usefully drive automobiles, air craft and smaller water craft. A problem has existed, however, with all known systems, either in actual use or as discussed in technical papers, in the control of the gas supply from the heat source to the turbine. Heretofore transient control of gas supply to gas driven turbines has been by two primary methods: 1. by-pass control where a portion of the gas flow is by-passed around the turbine, and 2. inventory control, where the working pressure of the gas is adjusted to match a particular power level. Though both systems have advantages both also have disadvantages. By-pass control is relatively fast but has the disadvantage of low cycle efficiencies at significant by-pass flows. Inventory control requires high and low pressure reservoirs which take up valuable space, and both systems require additional apparatus all of which present additional points of failure as well as maintenance requirements calling for additional personnel with the required expertise to service the additional apparatus.

There is thus a need for better control of the gas flow to a turbine which eliminates the foregoing disadvantages and it is the broad object of this invention to provide a closed gas turbine system, and particularly a direct closed cycle gas turbine system (Brayton cycle) utilizing a gas cooled nuclear reactor as the heat source, and which includes, in accordance with the invention an improved gas flow control system never heretofore contemplated in the art of closed cycle gas turbine systems.

SUMMARY OF THE INVENTION

The invention calls for a direct flow closed cycle gas turbine system wherein gas flow from the heat source to the turbine is controlled by a throttle valve which may be of a known type used in conventional steam turbine systems. This has never been contemplated before in the control of gas flow to a turbine in a closed cycle gas turbine system. I have discovered that such valves can be used safely and effectively in closed cycle gas turbine systems using either fossil fuel or nuclear fuel. Where fossil fuel is utilized as the heat source, when the valve is moved to decrease flow, the fuel supply for heating the gas must also be decreased but that is conventional in steam turbine systems. However, a throttle valve of the type mentioned is particularly useful, and the invention contemplates such use, with nuclear reactors of the gas cooled pebble-bed type wherein the fission material of the core has a negative temperature coefficient of reactivity whereby shut down of the core upon closure of the throttle valve is automatic upon the cessation of coolant flow due to the property of the core that, when coolant gas flow ceases, the temperature of the core increases to a hot subcritical level wherein for practical purposes no further heat is generated by the fission reaction. Were it not for this property of the fission material, shut down rods would have to be thrust into the core for each shut down which is time consuming. Further, because in the majority of cases, shut down is needed for only a relatively brief period, it is highly desirable that the core be safely shut down for such periods without the necessity of inserting into the core shut down rods whereby the reactor is restored in the shortest possible time to its critical heat generating mode upon reopening of the throttle valve. Shut down rods would, of course, be used for long term shut down periods and the use of shut down rods even for short periods, in conjunction with a throttle valve is within the purview of the invention.

The invention will be better understood when the following detailed description is red in conjunction with the accompanying drawings wherein:

BRIEF DESCRIPTION OF THE DRAWINGS

FIG. 3 is a vertical front cross sectional view of the valve of FIG. 2.

DETAILED DESCRIPTION OF THE INVENTION

Figure 1:
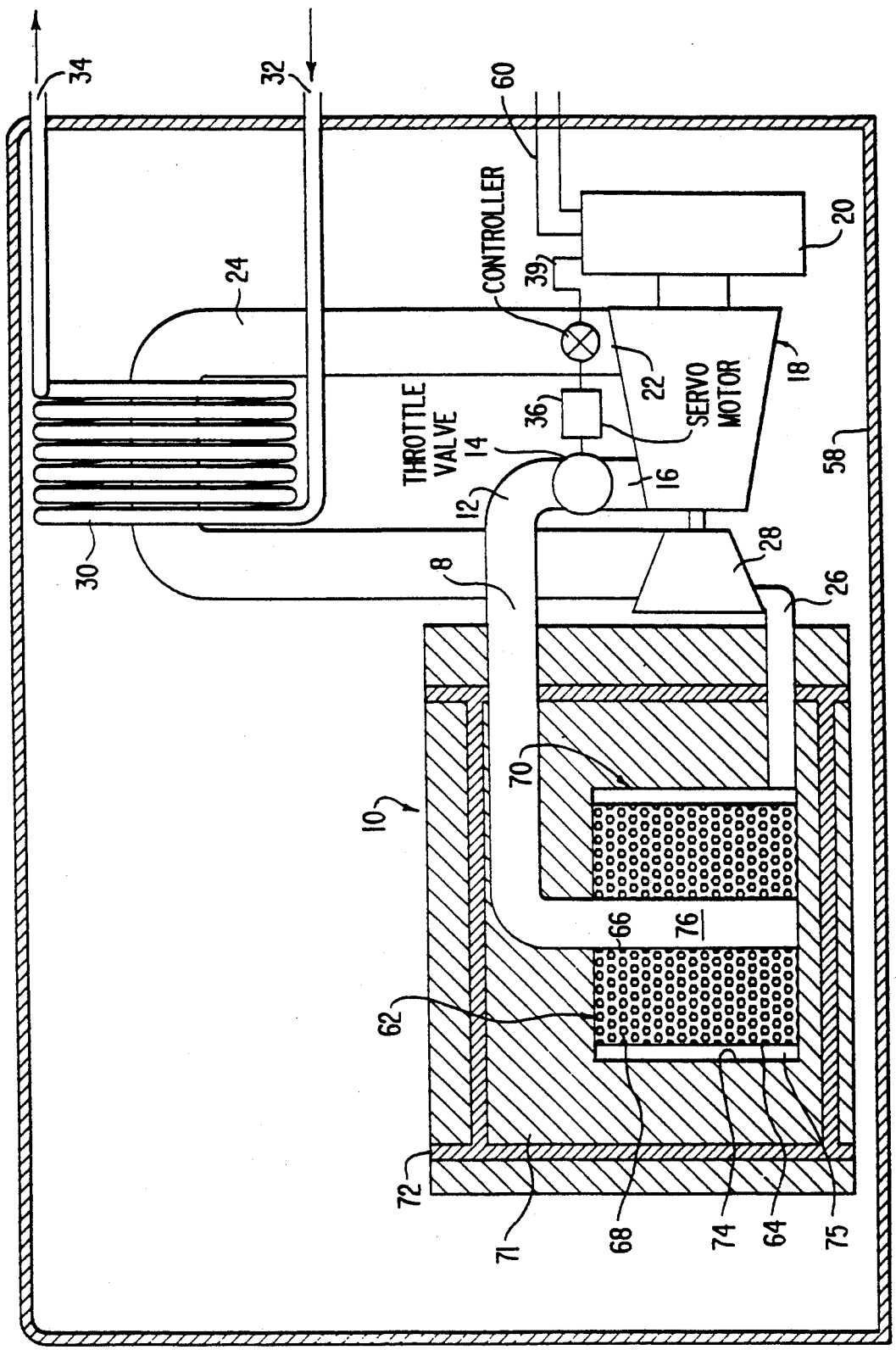
FIG. 1 is a schematic view of a closed cycle gas turbine system employing a gas cooled nuclear reactor as the heat source.

FIG. 1 illustrates a closed cycle direct gas power conversion system utilizing a nuclear reactor, broadly designated by the numeral 10, as a power source for heating an inert gas which may be nitrogen or helium, preferably the latter. From one aspect, the invention comprises a combination of components which includes a nuclear reactor as a heat source. From another aspect the invention comprises a similar combination of components wherein the heat source is not restricted to any particular type and may be fossil fuel as well as a nuclear reactor.

The system illustrated is a direct power conversion system wherein heated gas flows directly from the outlet 8 of a gas heater, e.g. the reactor 10, through a first conduit 12 containing, in accordance with the invention a throttle valve 14 described in detail below, and into to an inlet 16 of a turbine 18 drivingly connected to a variable load which may be the generator 20 shown, though the load could be any driven component such as a ship's propeller, vehicle wheels, etc. The turbine has an outlet 22 connected to a second conduit 24 leading back to an inlet 26 of the gas heater 10. A compressor 28, which may also be driven by the turbine 18, though separate turbines may be used to drive one or more compressors, is positioned to compress gas flowing in the second conduit 24, after the gas has passed through a gas cooler 30 between the compressor 28 and the outlet 22 of the turbine 18. The cooler 30 may receive a cooling medium usually water, flowing through the cooler by way of inlet and outlet conduits 32, 34, respectively.

It is known to control a throttle valve in a conventional steam turbine system by a servo motor and a controller responsive to sensed load of the unit driven by the turbine, e.g. a generator. The valve control illustrated in FIG. 1 is substantially the same as in a conventional steam turbine system in that is includes a servo motor 36 and a controller 38 which receives load signals from the generator 20 by way of a signal conductor 39.

Figure 2:
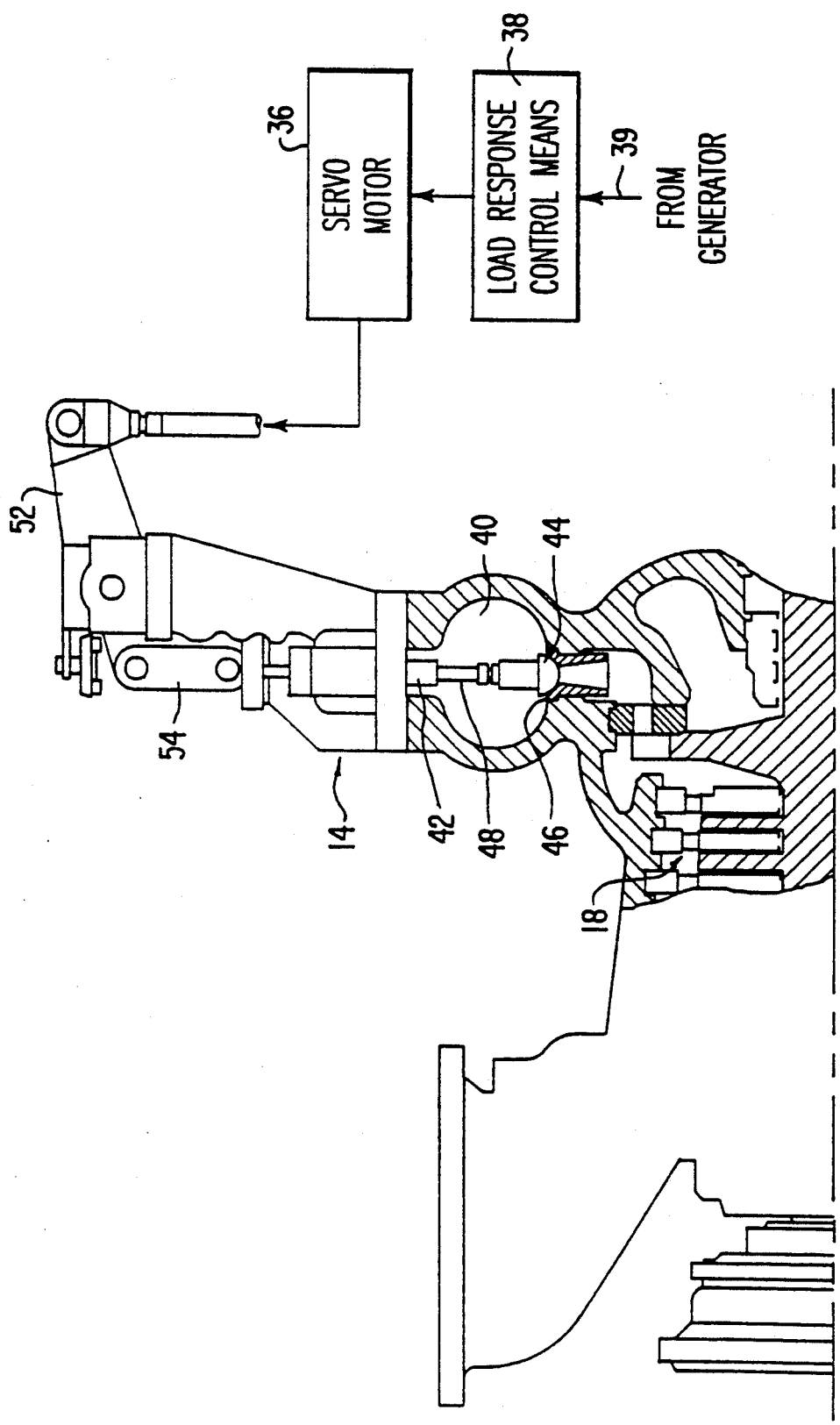
FIG. 2 is a somewhat schematic side view, partly in elevation and partly in section, of a gas turbine and a known steam turbine control valve which may be used in the system of the invention.

FIGS. 2 and 3 illustrate a typical stream turbine throttle valve which may be employed as the throttle valve 14 schematically shown in FIG. 1. Though throttle valves of the type illustrated at 14 in FIGS. 2 and 3 are old in the steam turbine art, such throttle valves have never heretofore been used in a closed cycle gas turbine system and the present invention depends, at least in part, on my discovery that a throttle valve for controlling gas flow is ideally suited to a closed cycle gas turbine system and particularly to a nuclear powered closed cycle gas turbine system.

It is important at this stage to make clear what is meant by the term "throttle valve". A throttle valve, within the context of the present invention, means a valve wherein the mass flow of fluid through the valve may be controlled and so long as the valve is positioned anywhere between its fully open and fully closed positions there is minimum pressure drop and friction loss of fluid across the valve. Hereinafter in the specification and claims any reference to a "throttle valve" will mean any valve having the just-described characteristics. Specifically excluded from the term "throttle valve", within the context of the present invention, is any type of butterfly valve since such valves, when partially open, cause a pressure drop across the valve.

The throttle valve 14 shown in FIGS. 2 and 3 comprises a valve chest 40 open at all times to the outlet of first conduit 12 leading into the reactor 10 or other heat source. Within the valve chest 40 is a valve lift bar 42 for actuating a plurality of poppet valves 44 cooperating with valve seats 46 between the chest 40 and turbine 18. The valves 46 are at the lower ends of valve stems 48 which extend slideably through apertures in the lift bar 42 and carry at their upper ends threaded stop nuts 50 which are positioned along the lengths of stems 48 at varying elevations relative to the bar 42 such that when the bar is lifted to a first position that valve 44 whose stop nut is closest to the bar, in this case the valve which is farthest to the right in FIG. 3 is lifted clear of its seat to its fully open position and pressurized gas flows into the turbine to drive the same but with minimum torque. When a load sensor (now shown) associated with the generator detects slowing of the turbine due to increased load demand on the generator, the bar is raised further to lift to its fully open position, but only after the first valve has been so opened, the valve whose stop nut is next closest to the bar, with this process being repeated until all the valves are lifted, each one having been fully opened before the next is opened, to enable the turbine to produce maximum torque when all are opened.

Movement of the bar 42 is effected by the servo motor 36, previously described in connection with FIG. 1, whose operation is controlled by the load responsive control means 38 which receives signals from a sensor (not shown) associated with the load device such as the generator 20. The sensor can be a speed sensor which detects a slowing of the generator due to increased load demands to instantly transmit a signal to the controller 38 which in turn commands the servo motor 36 to actuate rocker arms 52 to raise or lower through suitable links 54 the valve bar 42. The trapped springs 56, visible in FIG. 3, are for the purpose of at all times biassing the lift bar 42 towards its valve-closed position.

Returning now to FIG. 1 and the reactor 10, it will be noted that the reactor and all associated mechanism such as turbine 18, generator 20, compressor 28, etc. are located within a containment shield 58 penetrated by the cooling conduits 32, 34 and the electrical leads 60 from the generator. Normal access openings are provided in the shield but are not shown.

The core 62 of the reactor is an annulus formed of a pair of concentric perforated shells 64, 66 mounted on their ends in radially spaced positions to define an annular container for spherical fuel elements 68 of the type used in known pebble bed reactors. The core 62 is received concentrically in a cylindrical chamber 70 formed in a neutron shield 71 having embedded therein a gamma shield 72. The wall 74 of chamber 70 is radially spaced from the outer perforated shell 68 of the core to define an annular inlet cavity 75 connected to the inlet 26 leading from the outlet of the compressor 18. The center of the core 62 defines a cylindrical outlet cavity 76 connected to outlet 8 and the steam chest 40 of throttle valve 14 by way of the first conduit 12. With the described reactor, typically the gas pressure at the inlet of the turbine is about 200 psi at a temperature of about 950° C. (1700° F.)

The operation of the system when utilized in combination with a fossil fuel heat source should be apparent from the foregoing description. When the throttle valve is actuated, there must be a corresponding actuation of the fuel supply. This technique is well known in connection with conventional steam turbine plants.

With respect to operation of the system in connection with the reactor 10, at the outer surface 64 of the core where the coolant gas, preferably helium, enters the inlet cavity 75, there is a large temperature difference between the gas and the nuclear fuel, and a low coolant velocity past the outer fuel elements. As the gas travels past the elements towards the outlet cavity 76 of the core, the coolant gas is heated so that there is a smaller temperature difference and an increased velocity of the gas. Thus with the described structure of the reactor, there is improved leveling of the core power and temperature distribution.

The operation of the throttle valve 14 in response to load demand has been described above. Upon closing of the throttle valve, the flow of coolant gas through the reactor ceases but because the pebble bed is of the type having a negative temperature coefficient of reactivity, the temperature of the fuel rises to a high-subcritical level and ceases producing heat. Opening of the throttle valve initiates coolant flow through the reactor which is cooled to its critical level where it again produces heat. If the reactor is to be shut down for a prolonged period, following closing of the throttle valve in response, say, to operation of a manual override switch, shut down rods would be inserted into the core in a manner well recognized in the art.

It will be apparent to those skilled in this art that the invention is susceptible of a variety of changes and modifications, without, however, departing from the scope and spirit of the appended claims.

What is claimed is:

1. In a closed Brayton cycle gas turbine system comprising a gas heater having an inlet and an outlet, a gas turbine drivingly connected to a variable load and having an inlet and an outlet, a first conduit connecting the outlet of said gas heater with the inlet of said turbine, a second conduit between the outlet of said turbine and the inlet of said gas heater, a compressor for compressing gas in said second conduit and delivering said gas to the inlet of said gas heater, and a gas cooler in said second conduit between said compressor and the outlet of said turbine, the improvement comprising an adjustable throttle valve in said first conduit between the outlet of said gas heater and the inlet of said turbine, said throttle valve being constructed and arranged to adjust the mass flow of gas through said valve with substantially no pressure drop or friction loss and being substantially the sole means for controlling the power output of said turbine.

2. In the system of claim 1 including a control responsive to variations in said variable load for adjusting said throttle valve to admit gas to said turbine commensurate with the demands of said load.

3. In the system of claim 2 wherein said variable load is an electric generator.

4. In the system of claim 1 wherein said gas heater is a gas cooled nuclear reactor.

5. In the system of claim 4 wherein said nuclear reactor has a core of fission material having a negative temperature coefficient of reactivity.

6. In the system of claim 5 wherein the fission material comprises a pebble bed of spherical operating elements.

7. In the system of claim 6 wherein said core comprises an annulus defined by radially spaced inner and outer concentric perforated cylindrical walls between which is disposed the pebble bed of spherical operating elements, a closed cylindrical inlet cavity surrounding the outer wall of said core and connected to said inlet of said heater, the center of said core defining a cylindrical outlet cavity connected to the outlet of said heater.

8. The system of claim 1 wherein said throttle valve is a poppet type valve.

* * * * *